(12) United States Patent
Hashimoto (10) Patent No.: US 9,834,093 B2
(45) Date of Patent: Dec. 5, 2017

(54) ELECTRICALLY-POWERED VEHICLE

(71) Applicant: Keita Hashimoto, Toyota (JP)

(72) Inventor: Keita Hashimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 197 days.

(21) Appl. No.: 14/422,311

(22) PCT Filed: Oct. 25, 2012

(86) PCT No.: PCT/JP2012/077562
§ 371 (c)(1),
(2) Date: Feb. 18, 2015

(87) PCT Pub. No.: WO2014/064794
PCT Pub. Date: May 1, 2014

(65) Prior Publication Data
US 2015/0224878 A1    Aug. 13, 2015

(51) Int. Cl.
*B60L 1/00* (2006.01)
*B60K 6/28* (2007.10)
(Continued)

(52) U.S. Cl.
CPC .... *B60L 1/00* (2013.01); *B60K 6/28* (2013.01); *B60K 6/445* (2013.01); *B60L 1/02* (2013.01);
(Continued)

(58) Field of Classification Search
CPC ......................................................... B60L 1/00
(Continued)

(56) References Cited

U.S. PATENT DOCUMENTS

| | | | | |
|---|---|---|---|---|
| 5,555,725 A | * | 9/1996 | Shimasaki | ............ F01N 3/2013 219/202 |
| 8,423,221 B2 | * | 4/2013 | Watanabe | ............. F01N 3/2026 701/22 |

(Continued)

FOREIGN PATENT DOCUMENTS

| | | |
|---|---|---|
| JP | H08-61048 A | 3/1996 |
| JP | 2009-274470 A | 11/2009 |

(Continued)

*Primary Examiner* — Rexford Barnie
*Assistant Examiner* — Joseph Inge
(74) *Attorney, Agent, or Firm* — Oliff PLC (57) ABSTRACT

An EHC is configured to electrically heat a catalyst that purifies exhaust gas from an exhaust path of an internal combustion engine mounted on an electrically-powered vehicle, when a current passes through the EHC. A charger converts AC electric power supplied from an external power supply to a charging port into charging power of a power storage device by a power conversion path including an insulating transformer. The EHC is electrically connected to power lines which are provided on the primary side of the insulating transformer on the power conversion path, and to which a DC voltage is output. In a case where the EHC is operated when the vehicle travels, the charger converts the electric power from the power storage device into the DC voltage output to the power lines connected to the EHC, by a part of inverse conversion of power conversion at the time of external charging.

10 Claims, 4 Drawing Sheets

(51) Int. Cl.
*B60K 6/445* (2007.10)
*B60L 11/14* (2006.01)
*B60W 10/30* (2006.01)
*B60W 20/00* (2016.01)
*B60L 1/08* (2006.01)
*B60L 7/14* (2006.01)
*B60L 11/12* (2006.01)
*B60L 11/18* (2006.01)
*B60L 15/00* (2006.01)
*B60W 20/16* (2016.01)
*B60L 1/02* (2006.01)
*F01N 3/20* (2006.01)

(52) U.S. Cl.
CPC *B60L 1/08* (2013.01); *B60L 7/14* (2013.01); *B60L 11/123* (2013.01); *B60L 11/14* (2013.01); *B60L 11/1811* (2013.01); *B60L 11/1816* (2013.01); *B60L 15/007* (2013.01); *B60W 10/30* (2013.01); *B60W 20/00* (2013.01); *B60W 20/16* (2016.01); *B60L 2210/10* (2013.01); *B60L 2210/30* (2013.01); *B60L 2210/40* (2013.01); *B60L 2220/14* (2013.01); *B60L 2240/547* (2013.01); *B60L 2240/549* (2013.01); *B60L 2270/12* (2013.01); *B60Y 2300/474* (2013.01); *B60Y 2400/214* (2013.01); *F01N 3/2013* (2013.01); *Y02T 10/6217* (2013.01); *Y02T 10/6239* (2013.01); *Y02T 10/6269* (2013.01); *Y02T 10/645* (2013.01); *Y02T 10/7005* (2013.01); *Y02T 10/7072* (2013.01); *Y02T 10/7077* (2013.01); *Y02T 10/7216* (2013.01); *Y02T 10/7241* (2013.01); *Y02T 90/127* (2013.01); *Y02T 90/14* (2013.01)

(58) Field of Classification Search
USPC .......................................... 307/10.1
See application file for complete search history.

(56) References Cited

U.S. PATENT DOCUMENTS

| | | | |
|---|---|---|---|
| 8,661,796 B2* | 3/2014 | Yoshioka | F01N 3/2013 60/295 |
| 2009/0277705 A1* | 11/2009 | Ichikawa | B60K 6/445 180/65.275 |
| 2010/0280698 A1* | 11/2010 | Ichikawa | B60K 6/445 701/22 |
| 2012/0323419 A1* | 12/2012 | Hashimoto | B60K 6/445 701/22 |
| 2013/0008148 A1* | 1/2013 | Katsuta | B60W 10/26 60/274 |
| 2014/0109556 A1* | 4/2014 | Hashimoto | B60L 3/0069 60/299 |

FOREIGN PATENT DOCUMENTS

| | | |
|---|---|---|
| JP | 2009-274471 A | 11/2009 |
| JP | 2009-274479 A | 11/2009 |
| JP | 2009-286337 A | 12/2009 |
| WO | 2011/111176 A1 | 9/2011 |
| WO | 2012/111102 A1 | 8/2012 |

* cited by examiner

ELECTRICALLY-POWERED VEHICLE

TECHNICAL FIELD

The present invention relates to an electrically-powered vehicle having mounted thereon an internal combustion engine and a traction motor. Particularly, the present invention relates to an electrically-powered vehicle in which an electrical heated catalyst device (hereinafter also referred to as "EHC") is provided in an exhaust passage of an internal combustion engine and a vehicle-mounted power storage device can be charged by a power supply external to the vehicle.

BACKGROUND ART

Japanese Patent Laying-Open No. 2009-274479 (PTD 1) discloses a configuration of an electric system in a case where an exhaust gas purification device including an EHC is mounted on a hybrid vehicle which is a typical example of an electrically-powered vehicle in which a vehicle-mounted power storage device can be charged by a power supply external to the vehicle (hereinafter also referred to as "external power supply"). During operation, the EHC generates heat by the passage of a current through the EHC, so that the catalyst temperature increases. In the following description, charging of the vehicle-mounted power storage device by the external power supply will be also simply referred to as "external charging".

PTD 1 discloses the configuration of the electric system for allowing the current to pass through the EHC by using a charger for external charging. Specifically, PTD 1 discloses the configuration of the charger formed of an insulated-type power converter including a transformer, in which the EHC is connected in parallel to a primary winding or a secondary winding of the transformer. As a result, the EHC can be operated by an AC voltage generated at the winding of the transformer.

CITATION LIST

Patent Document

PTD 1: Japanese Patent Laying-Open No. 2009-274479
PTD 2: Japanese Patent Laying-Open No. 2009-274470
PTD 3: Japanese Patent Laying-Open No. 2009-286337
PTD 4: Japanese Patent Laying-Open No. 2009-274471
PTD 5: Japanese Patent Laying-Open No. 8-61048

SUMMARY OF INVENTION

Technical Problem

Since the EHC is exposed to soot and water, occurrence of an electrical abnormality due to a decrease in insulation resistance is a concern. Therefore, it is preferable to allow the current to pass through the EHC by using an insulated-type power supply having a transformer and the like embedded therein. According to PTD 1, by using a voltage converting unit of the insulated-type charger for external charging, the EHC can be supplied with the electric power both during external charging and during travelling.

In the configuration of PTD 1, however, the high-frequency AC voltage is applied to the EHC, and thus, it becomes difficult to control the electric power of the EHC basically formed of a resistive element. Particularly, the difficulty of executing, during external charging, both control of the charging power of the power storage device and control of the electric power of the EHC is a concern.

The present invention has been made to solve the aforementioned problem, and an object thereof is to, in an externally-chargeable electrically-powered vehicle having an EHC mounted thereon, supply electric power to the EHC so as to allow easy control of the electric power of the EHC, by using an insulated-type charger for external charging.

Solution to Problem

An aspect of the present invention is directed to an electrically-powered vehicle having mounted thereon an internal combustion engine and a motor for causing the vehicle to travel, the electrically-powered vehicle including: a power storage device for storing electric power supplied to the motor; a power receiving unit for receiving the electric power supplied from a power supply external to the vehicle (external power supply); a charger for performing AC/DC power conversion for converting the electric power received by the power receiving unit into charging power of the power storage device, when the electric power is supplied from the external power supply; and an electrical heated catalyst device. The charger performs the AC/DC power conversion by a power conversion path passing through an insulating mechanism configured to transmit electric energy with a primary side electrically connected to the power receiving unit electrically insulated from a secondary side electrically connected to the power storage device. The charger has first and second power lines between which a DC voltage is output. The first and second power lines are electrically connected to the primary side of the insulating mechanism somewhere on the power conversion path. The electrical heated catalyst device is configured to be electrically connected to the first and second power lines, for electrically heating a catalyst that purifies exhaust gas from the internal combustion engine. The charger is configured to be capable of converting the electric power from the power storage device into the DC voltage output to the first and second power lines, by a part of inverse conversion of the AC/DC power conversion.

Preferably, in a case where the electrical heated catalyst device is operated when the power storage device is charged by the power supply, the charger controls electric power supplied to the electrical heated catalyst device by controlling the DC voltage between the first and second power lines, and controls the charging power of the power storage device by controlling DC power conversion between the first and second power lines and the power storage device.

Preferably, in a case where the electrical heated catalyst device is operated when the electric power is not supplied from the power supply, the charger converts the electric power from the power storage device into the DC voltage by performing the inverse conversion, and outputs the DC voltage to the first and second power lines.

Another aspect of the present invention is directed to an electrically-powered vehicle having mounted thereon an internal combustion engine and a motor for causing the vehicle to travel, the electrically-powered vehicle including: a power storage device for storing electric power supplied to the motor; a power receiving unit for receiving the electric power supplied from a power supply external to the vehicle (external power supply); a charger for converting the electric power received by the power receiving unit into charging power of the power storage device when the electric power is supplied from the external power supply; and an electrical heated catalyst device. The charger has first and second power converting units. The first power converting unit is configured to convert AC electric power received by the power receiving unit into DC electric power, and output the DC electric power to between first and second power lines. The second power converting unit is configured to perform bidirectional power conversion between the power storage device and the first and second power lines by a power conversion path passing through an insulating mechanism configured to transmit electric energy with a primary side electrically connected to the first and second power lines electrically insulated from a secondary side electrically connected to the power storage device. The electrical heated catalyst device is configured to be electrically connected to the first and second power lines, for electrically heating a catalyst that purifies exhaust gas from the internal combustion engine.

Preferably, in a case where the electrical heated catalyst device is operated when the power storage device is charged by the power supply, the charger controls the electric power supplied to the electrical heated catalyst device by controlling a DC voltage between the first and second power lines by the first power converting unit, and controls the charging power of the power storage device by the second power converting unit.

Preferably, the electrically-powered vehicle further includes: a first interrupting mechanism arranged between the first power line and the electrical heated catalyst device; and a second interrupting mechanism arranged between the second power line and the electrical heated catalyst device.

Advantageous Effects of Invention

According to the present invention, in an externally-chargeable electrically-powered vehicle having an EHC mounted thereon, electric power can be supplied to the EHC so as to allow easy control of the electric power of the EHC, by using an insulated-type charger for external charging.

DESCRIPTION OF EMBODIMENTS

An embodiment of the present invention will be hereinafter described in detail with reference to the drawings. The same or corresponding portions are represented by the same reference characters in the drawings, and description thereof will not be repeated.

Figure 1:
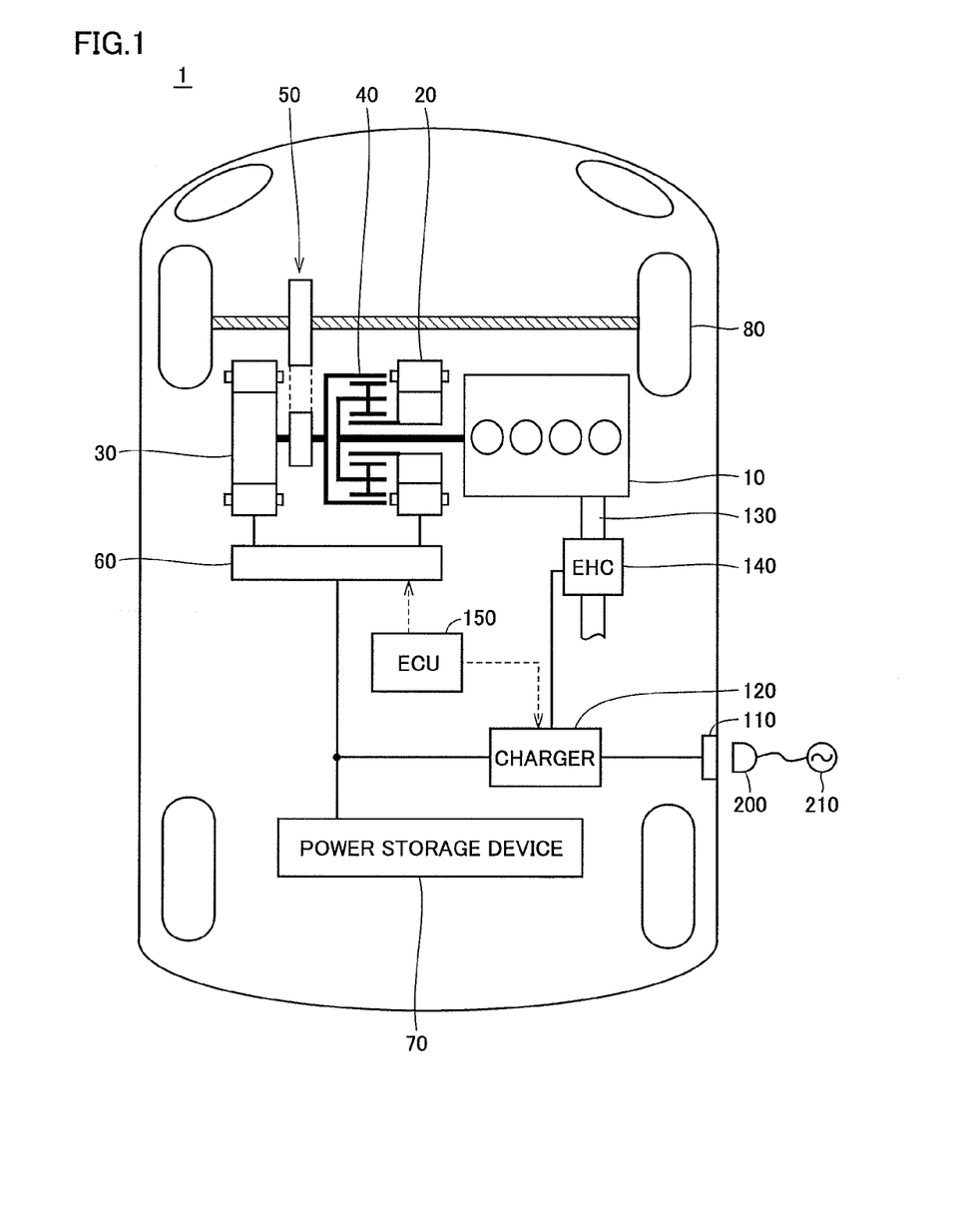
FIG. 1 is an overall block diagram of a hybrid vehicle shown as a typical example of an externally-chargeable electrically-powered vehicle according to an embodiment of the present invention.

FIG. 1 is an overall block diagram of a hybrid vehicle shown as a typical example of an externally-chargeable electrically-powered vehicle according to an embodiment of the present invention.

Referring to FIG. 1, a hybrid vehicle 1 includes an engine 10, a first MG (Motor Generator) 20, a second MG 30, a power split device 40, a reduction gear 50, a motor drive device 60, a power storage device 70, and a drive wheel 80. Hybrid vehicle 1 further includes an exhaust passage 130, an EHC 140 and an ECU (Electronic Control Unit) 150. Engine 10, first MG 20 and second MG 30 are coupled to power split device 40.

Hybrid vehicle 1 travels by using driving force output from at least one of engine 10 and second MG 30. Motive power generated by engine 10 is split by power split device 40 into two paths, that is, one path through which the motive power is transmitted to drive wheel 80 via reduction gear 50, and the other through which the motive power is transmitted to first MG 20.

Engine 10 is configured to output the vehicle driving force by the energy obtained by fuel combustion. EHC 140 is configured to be provided in exhaust passage 130 of engine 10, for electrically heating a catalyst that purifies exhaust gas discharged from engine 10. During operation, EHC 140 generates heat by the passage of a current through EHC 140, so that the catalyst temperature increases. Various known EHCs can be used as EHC 140.

First MG 20 and second MG 30 are AC motors, and are formed of, for example, three-phase AC synchronous motors. Motor drive device 60 performs bidirectional power conversion between power storage device 70 and first and second MGs 20 and 30, thereby controlling outputs (rotation speed and/or torque) of first MG 20 and second MG 30.

First MG 20 generates electric power by using the motive power of engine 10 split by power split device 40. The electric power generated by first MG 20 is converted from AC to DC by motor drive device 60, and then is stored in power storage device 70.

Second MG 30 generates driving force by using at least one of the electric power stored in power storage device 70 and the electric power generated by first MG 20. The driving force of second MG 30 is transmitted to drive wheel 80 via reduction gear 50. Although drive wheel 80 is shown as a front wheel in FIG. 1, a rear wheel may be driven by second MG 30, instead of the front wheel or together with the front wheel.

It is noted that, at the time of braking and the like of the vehicle, second MG 30 is driven by drive wheel 80 via reduction gear 50, and second MG 30 operates as a generator. As a result, second MG 30 also functions as a regenerative brake for converting kinetic energy of the vehicle to electric power. The electric power generated by second MG 30 is stored in power storage device 70.

Power split device 40 is formed of a planetary gear including a sun gear, a pinion gear, a carrier, and a ring gear. The pinion gear engages the sun gear and the ring gear. The carrier rotatably supports the pinion gear, and in addition, is coupled to a crankshaft of engine 10. The sun gear is coupled to a rotation shaft of first MG 20. The ring gear is coupled to a rotation shaft of second MG 30 and reduction gear 50.

Figure 2:
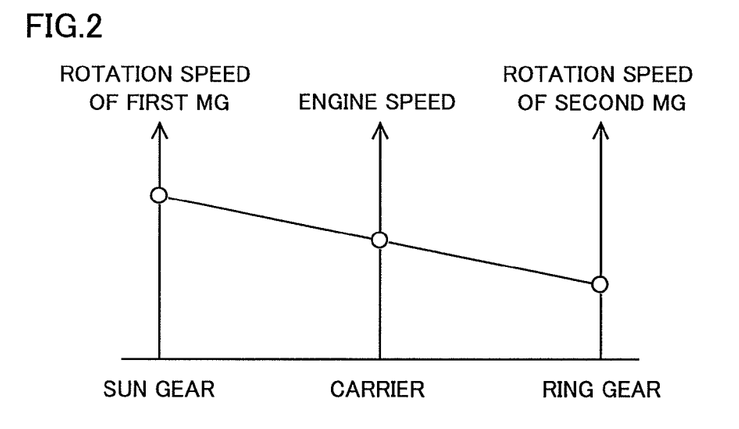
FIG. 2 is a collinear chart of a power split device.

Engine 10, first MG 20 and second MG 30 are coupled with power split device 40 formed of the planetary gear being interposed therebetween, so that the relationship between rotation speeds of engine 10, first MG 20 and second MG 30 is such that they are connected by a straight line in a collinear chart as shown in FIG. 2.

Referring again to FIG. 1, motor drive device 60 receives electric power from power storage device 70 and drives first MG 20 and second MG 30 based on a control signal from ECU 150. In addition, based on a control signal from ECU 150, motor drive device 60 converts AC electric power generated by first MG 20 and/or second MG 30 to DC electric power, and outputs the DC electric power to power storage device 70.

Power storage device 70 is a rechargeable DC power supply, and is formed of a secondary battery such as nickel-metal hydride and lithium ion, for example. The voltage of power storage device 70 is, for example, about 200 V. In addition to the electric power generated by first MG 20 and second MG 30, electric power supplied from an external power supply 210 is stored in power storage device 70, as will be described hereinafter. It is noted that a large-capacitance capacitor can also be employed as power storage device 70.

Hybrid vehicle 1 further includes a charging port 110 and a charger 120 as a configuration for external charging.

Charging port 110 is an electric power interface for receiving electric power from external power supply 210. At the time of external charging, a connector 200 of a charging cable through which electric power is supplied from external power supply 210 to the vehicle is connected to charging port 110. Charging port 110 can also be configured such that the electric power is supplied from the external power supply by electromagnetic coupling between the external power supply and the vehicle in a contactless manner, in addition to electrical connection by the cable. Namely, it is noted for the sake of confirmation that the manner of electric power supply from external power supply 210 to charging port 110 is not particularly limited in hybrid vehicle 1.

Charger 120 is electrically connected to charging port 110, power storage device 70 and EHC 140 (described below). Charger 120 is configured to convert the electric power supplied from external power supply 210 to the charging power of power storage device 70 during external charging, based on a control signal from ECU 150. Furthermore, in the present embodiment, charger 120 is configured to supply the electric power to EHC 140 both when external charging is performed and when the electric power is not supplied from the external power supply, including when the vehicle is traveling. An example of a configuration and the operation of charger 120 will be described in detail below.

ECU 150 is configured to have a not-shown CPU (Central Processing Unit) and a not-shown memory embedded therein, and perform computations using values detected by sensors, based on a map and a program stored in the memory. Alternatively, at least a part of ECU 150 may be configured to perform prescribed numerical and logical computations by using hardware such as an electronic circuit.

ECU 150 generates control signals for driving motor drive device 60 and charger 120, and outputs the generated control signals to motor drive device 60 and charger 120.

Figure 3:
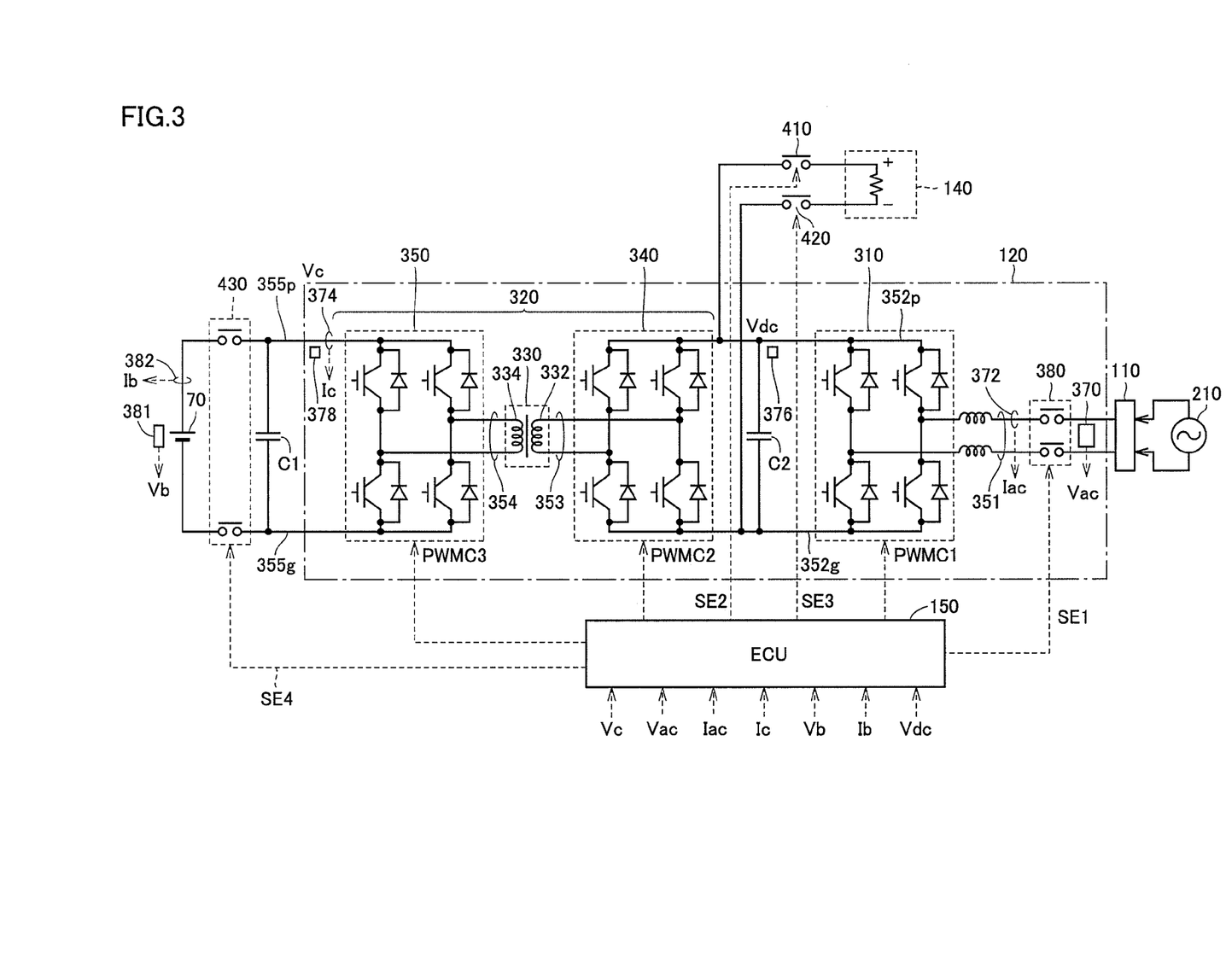
FIG. 3 is a circuit diagram showing an example of a configuration of a charger shown in FIG. 1.

FIG. 3 is a circuit diagram showing an example of a configuration of charger 120 shown in FIG. 1.

Referring to FIG. 3, charger 120 includes an AC/DC converting unit 310, a DC/DC converting unit 320, an insulating transformer 330, a relay 380, voltage sensors 370, 376 and 378, and current sensors 372 and 374.

Relay 380 is placed between charging port 110 and AC/DC converting unit 310, and is turned on/off based on a control signal SE1 from ECU 150. During external charging, the AC electric power is input from external power supply 210 to a power line 351 via relay 380 and charging port 110. An AC voltage Vac and an AC current Iac of power line 351 are detected by voltage sensor 370 and current sensor 372, respectively. The values detected by voltage sensor 370 and current sensor 372 are output to ECU 150.

AC/DC converting unit 310 is formed of a single-phase full-bridge circuit. DC/DC converting unit 320 has voltage converting units 340 and 350, each of which is formed of a single-phase full-bridge circuit, and insulating transformer 330.

During external charging, AC/DC converting unit 310 converts the AC electric power of power line 351 into DC electric power based on a control signal PWMC1 from ECU 150, and outputs the DC electric power to between power lines 352$p$ and 352$g$. A capacitor C2 is connected between power lines 352$p$ and 352$g$. A DC voltage Vdc between power lines 352$p$ and 352$g$ is detected by voltage sensor 376. The value detected by voltage sensor 376 is output to ECU 150.

For example, by turning on/off a switching element that forms the full bridge, AC/DC converting unit 310 controls a current passing through a reactor inserted into and connected to power line 351. At this time, AC/DC converting unit 310 controls the reactor current such that a current waveform (phase and amplitude) of AC current Iac matches with a target current waveform, and AC/DC converting unit 310 outputs the DC current to power line 352$p$. Furthermore, by matching a phase of the target current waveform with a phase of AC voltage Vac, a power factor of the input electric power from external power supply 210 can be increased. In addition, by adjusting an amplitude of the target current waveform in accordance with a difference between a detection value and a target value of DC voltage Vdc, DC voltage Vdc can be controlled to the target value.

During external charging, voltage converting unit 340 of DC/DC converting unit 320 converts the DC electric power output from AC/DC converting unit 310 to power lines 352$p$ and 352$g$ into high-frequency AC electric power based on a control signal PWMC2 from ECU 150, and outputs the high-frequency AC electric power to a power line 353. Power line 353 is connected to a primary coil 332 of insulating transformer 330.

Insulating transformer 330 has a core made of a magnetic material, as well as primary coil 332 and a secondary coil 334 wound around the core. Primary coil 332 and secondary coil 334 are electrically insulated from each other. In insulating transformer 330, the voltage level is converted between an AC voltage of primary coil 332 and an AC voltage of secondary coil 334 in accordance with a winding ratio of primary coil 332 and secondary coil 334. Secondary coil 334 of insulating transformer 330 is connected to a power line 354.

During external charging, voltage converting unit 350 converts the AC electric power of power line 354 into DC electric power based on a control signal PWMC3 from ECU 150, and outputs the DC electric power to between power lines 355$p$ and 355$g$. Power lines 355$p$ and 355$g$ are electrically connected to a positive electrode and a negative electrode of power storage device 70, respectively. A voltage sensor 381 and a current sensor 382 for detecting a voltage Vb and a current Ib, respectively, are arranged in power storage device 70. Detected voltage Vb and current Ib of power storage device 70 are output to ECU 150.

A capacitor C1 is connected between power lines 355$p$ and 355$g$. A charging relay 430 turned on/off in accordance with a control signal SE4 from ECU 150 may be provided between power lines 355$p$ and 355$g$ and power storage device 70.

Current sensor 374 and voltage sensor 378 for detecting a DC current Ic and a DC voltage Vc, respectively, are arranged in power lines 355$p$ and 355$g$. The values detected by current sensor 374 and voltage sensor 378 are output to ECU 150.

During external charging, by turning on/off switching elements that form voltage converting units 340 and 350, the charging power (voltage Vc and current Ic) of power storage device 70 can be controlled. Namely, DC/DC converting unit 320 formed by voltage converting units 340 and 350 and insulating transformer 330 converts the DC electric power of power lines 355p and 355g into the charging power of power storage device 70 via a power conversion path passing through insulating transformer 330.

Each of voltage converting units 340 and 350 is formed of a full-bridge circuit that can perform bidirectional power conversion. Therefore, during non external charging including during vehicle traveling, DC/DC converting unit 320 can convert the DC electric power from power storage device 70 into the DC electric power output to power lines 352p and 352g via the power conversion path passing through insulating transformer 330, by inverse conversion of the power conversion during external charging. At this time, by turning on/off the switching elements that form voltage converting units 340 and 350, DC voltage Vdc of power lines 352p and 352g can be controlled to the target value. As described above, DC/DC converting unit 320 is configured to perform bidirectional DC power conversion between power storage device 70 and power lines 352p and 352g.

EHC 140 is electrically connected to power lines 352p and 352g included in the power conversion path in charger 120. Power lines 352p and 352g are electrically insulated from power storage device 70 by insulating transformer 330.

Furthermore, an EHC relay 410 is provided between EHC 140 and power line 352p, and an EHC relay 420 is provided between EHC 140 and power line 352g. EHC relays 410 and 420 are turned on/off in accordance with control signals SE2 and SE3 from ECU 150, respectively. As EHC relays 410 and 420, arbitrary switches that can control ON and OFF can be used as "interrupting mechanisms", instead of the relays.

By turning on EHC relays 410 and 420, DC voltage Vdc between power lines 352p and 352g is supplied to EHC 140. Assuming that an electrical resistance value of EHC 140 is R, the electric power of EHC 140 is $(Vdc)^2/R$. Namely, by controlling DC voltage Vdc, the electric power that determines an amount of heat generated by EHC 140 can be controlled.

Figure 4:
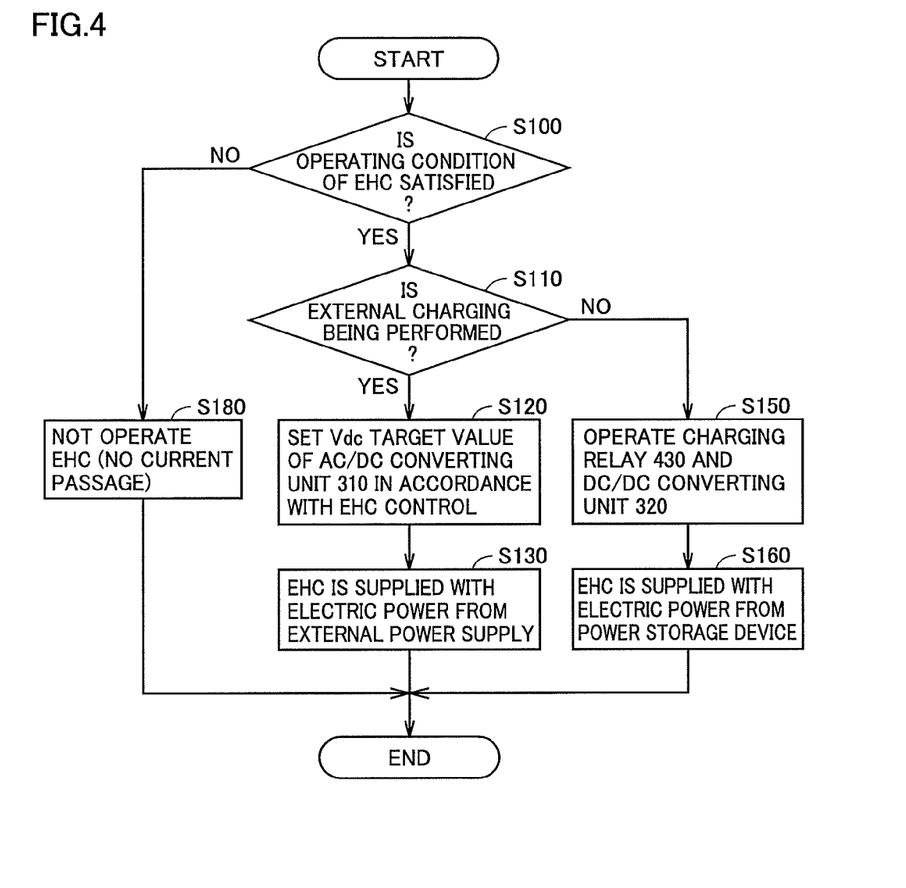
FIG. 4 is a flowchart for describing control of current passage through an EHC in the circuit shown in FIG. 3.

FIG. 4 shows a flowchart for describing control of current passage through EHC 140. A series of processing shown in FIG. 4 is executed by ECU 150.

Referring to FIG. 4, in step S100, ECU 150 determines whether an operating condition of EHC 140 is satisfied or not. For example, during vehicle traveling, the operating condition of EHC 140 is satisfied when the catalyst temperature is lower than a prescribed temperature. Alternatively, the operating condition of EHC 140 can also be set during external charging such that the catalyst is preliminarily warmed up to prepare for vehicle driving after completion of external charging.

If the operating condition of EHC 140 is not satisfied (NO in S100), the processing is ended without allowing the current to pass through EHC 140 (step S180).

If the operating condition of EHC 140 is satisfied (YES in S100), ECU 150 determines whether external charging is being performed or not (step S110).

If the operation of EHC 140 is requested during external charging (YES in S110), ECU 150 sets, in step S120, the target value of DC voltage Vdc to AC/DC converting unit 310 in charger 120 at a voltage value corresponding to the appropriate electric power that allows EHC 140 to function fully. As a result, in the power conversion from charging port 110 to power storage device 70 by charger 120, DC voltage Vdc output to between power lines 352p and 352g allows the current to pass through EHC 140. As a result, EHC 140 can be supplied with the electric power from external power supply 210 (step S130). AC/DC converting unit 310 controls DC voltage Vdc to the target value, and thereby, the electric power of EHC 140 can be easily controlled.

Furthermore, by controlling the DC power conversion by DC/DC converting unit 320, DC voltage Vdc suitable for allowing the current to pass through EHC 140 can be converted into charging voltage Vc and charging current Ic for appropriately charging power storage device 70. Namely, during external charging, the electric power can be supplied in parallel to both EHC 140 and power storage device 70 by using charger 120, and the electric power supplied to both EHC 140 and power storage device 70 can be controlled by AC/DC converting unit 310 and DC/DC converting unit 320, respectively.

In a state where the electric power from external power supply 210 is input to charging port 110 (e.g., in a state where connector 200 remains connected to charging port 110) after charging of power storage device 70 is completed, it is also possible that only AC/DC converting unit 310 in charger 120 is operated, and thereby, EHC 140 is supplied with the electric power from external power supply 210.

If the operation of EHC 140 is requested during non external charging (NO in S110), ECU 150 turns on charging relay 430 and operates at least DC/DC converting unit 320 in charger 120 in step S150.

DC/DC converting unit 320 converts the DC electric power output from power storage device 70 into DC voltage Vdc for allowing the current to pass through EHC 140, and outputs DC voltage Vdc to between power lines 352p and 352g. As a result, even when the electric power from external power supply 210 cannot be used (typically, during vehicle traveling), the electric power of power storage device 70 allows the current to pass through EHC 140 (step S160). At this time, DC/DC converting unit 320 controls DC voltage Vdc, and thereby, the electric power of EHC 140 can be easily controlled. The target value of DC voltage Vdc can be set at the voltage value corresponding to the appropriate electric power that allows EHC 140 to function fully.

As described above, during non external charging, EHC 140 can be supplied with the electric power by the power conversion from power storage device 70 to power lines 352p and 352g, which is a part of the inverse conversion of the power conversion from charging port 110 to power storage device 70 during external charging.

During non external charging and during non traveling, AC/DC converting unit 310 can also operate to convert the DC voltage between power lines 352p and 352g into the AC electric power equivalent to that of external power supply 210 (e.g., commercial system power supply). With such a configuration, by connecting the cable to charging port 110, the electric power can be supplied to outside the vehicle by using the electric power stored in power storage device 70.

Referring again to FIG. 3, power storage device 70 and EHC 140 are electrically insulated by insulating transformer 330. Therefore, even if an electrical abnormality such as electric leakage occurs in EHC 140 during operation of EHC 140 by the electric power of power storage device 70, electrical insulation between EHC 140 and the traveling system (motor drive device 60, first MG 20, second MG 30 and the like shown in FIG. 1) electrically connected to power storage device 70 is ensured.

In addition, by turning off EHC relays 410 and 420, EHC 140 can be electrically separated from both power lines 352p and 352g. Therefore, even if an electrical abnormality such as electric leakage occurs in EHC 140, EHC 140 can be electrically insulated from the power conversion path in charger 120.

As described above, in the hybrid vehicle (electrically-powered vehicle) according to the present embodiment, the controllable DC voltage can be supplied to EHC 140 by using charger 120 for external charging, both during external charging and during non external charging including during vehicle traveling. Therefore, the electric power of EHC 140 can be easily controlled such that EHC 140 can function fully. In addition, because of the configuration in which power storage device 70 and EHC 140 are electrically insulated by insulating transformer 330 in charger 120, EHC 140 can be supplied with the electric power. Therefore, even if an electrical abnormality such as electric leakage occurs in EHC 140, it is possible to prevent the electrical abnormality from affecting the traveling system electrically connected to power storage device 70.

Furthermore, EHC relays 410 and 420 (interrupting mechanisms) are provided both on the positive electrode side and on the negative electrode side of EHC 140. As a result, even if an electrical abnormality such as electric leakage occurs in EHC 140, it is possible to prevent the electrical abnormality from affecting external charging. In addition, during external charging, the converter (AC/DC converting unit 310) for outputting DC voltage Vdc supplied to EHC 140 and the converter (DC/DC converting unit 320) for converting DC voltage Vdc into the charging power of power storage device 70 are controlled independently. Therefore, the electric power supplied to EHC 140 and the charging power of power storage device 70 are controlled, respectively, and the electric power can be supplied in parallel to both EHC 140 and power storage device 70.

In the present embodiment, a series/parallel-type hybrid vehicle has been described, in which the motive power of engine 10 can be split into drive wheel 80 and first MG 20 by power split device 40. However, application of the present invention is not limited to the illustration in the embodiment. The electrically-powered vehicle to which the present invention is applied includes, in a comprehensive manner, a vehicle that can generate the vehicle driving force by electric energy. As long as the electrically-powered vehicle is an externally-chargeable electrically-powered vehicle having an internal combustion engine and an EHC mounted thereon, the present invention is similarly applicable, without limiting a configuration of a driveline. For example, the present invention is also applicable to a so-called parallel-type hybrid vehicle in which a power split device is not included and wheels are driven by an engine and a motor, and a series-type hybrid vehicle in which an engine is used only for power generation.

Charger 120 described in the present embodiment corresponds to one example of "charger" in the present invention. The configuration of charger 120 is not limited to the example of the configuration in FIG. 3. An arbitrary circuit configuration can be used as long as power storage device 70 and charging port 110 are electrically insulated and power conversion is performed. In this case as well, by insulating EHC 140 from power storage device 70 by the insulating mechanism and electrically connecting EHC 140 to the power line to which the DC voltage is output, the electric power of EHC 140 can be supplied similarly to the present embodiment.

In the foregoing description, engine 10 corresponds to one example of "internal combustion engine" in the present invention, and second MG 30 corresponds to one example of "motor" in the present invention. In addition, charging port 110 corresponds to one example of "power receiving unit" in the present invention, and EHC 140 corresponds to one example of "electrical heated catalyst device" in the present invention. EHC relays 410 and 420 correspond to examples of "first interrupting mechanism" and "second interrupting mechanism" in the present invention, respectively.

In charger 120, power lines 352p and 352g correspond to examples of "first power line" and "second power line" in the present invention, respectively, and insulating transformer 330 corresponds to one example of "insulating mechanism" in the present invention. Furthermore, AC/DC converting unit 310 corresponds to one example of "first power converting unit" in the present invention, and DC/DC converting unit 320 corresponds to one example of "second power converting unit" in the present invention.

It should be understood that the embodiment disclosed herein is illustrative and not limitative in any respect. The scope of the present invention is defined by the terms of the claims, rather than the above description of the embodiment, and is intended to include any modifications within the scope and meaning equivalent to the terms of the claims.

INDUSTRIAL APPLICABILITY

The present invention is applicable to an electrically-powered vehicle having mounted thereon an internal combustion engine and a motor for causing the vehicle to travel, and including an electrical heated catalyst device.

REFERENCE SIGNS LIST

1 hybrid vehicle; 10 engine; 20 first MG; 30 second MG; 40 power split device; 50 reduction gear; 60 motor drive device; 70 power storage device; 80 drive wheel; 110 charging port; 120 charger; 130 exhaust passage; 140 EHC; 150 ECU; 200 connector; 210 external power supply; 310 AC/DC converting unit; 320 DC/DC converting unit; 330 insulating transformer; 332 primary coil; 334 secondary coil; 340, 350 voltage converting unit; 351, 352g, 352p, 353, 354, 355p, 355g power line; 370, 376, 378, 381 voltage sensor; 372, 374, 382 current sensor; 380 relay; 410, 420 EHC relay; 430 charging relay; C1, C2 capacitor; Ib current (power storage device); Ic DC current (charging current); PWMC1, PWMC2, PWMC3, SE1 to SE4 control signal; Vb voltage (power storage device); Vc DC voltage (charging voltage).

The invention claimed is:

1. An electrically-powered vehicle having mounted thereon an internal combustion engine and a motor for causing the vehicle to travel, the electrically-powered vehicle comprising:
an insulating mechanism having a primary side and a secondary side;
a power storage device for storing electric power supplied to said motor, the power storage device being electrically connected to the secondary side and electrically insulated from the primary side;
a power receiving unit for receiving the electric power supplied from a power supply external to the vehicle;
a charger for performing AC/DC power conversion for converting the electric power received by said power receiving unit into charging power of said power storage device, when the electric power is supplied from said power supply, by a power conversion path passing through the insulating mechanism that is configured to transmit electric energy with the primary side electrically connected to said power receiving unit electrically insulated from the secondary side electrically connected to said power storage device, said charger having first and second power lines which are electrically connected to the primary side of said insulating mechanism on said power conversion path, and between which a DC voltage is output; and an electrical heated catalyst device electrically connected to said first and second power lines so as to connect it to the primary side of said insulating mechanism and supply it with the DC voltage, the electrical heated catalyst being for electrically heating a catalyst that purifies exhaust gas from said internal combustion engine, wherein said charger is configured to be capable of converting the electric power from said power storage device into the DC voltage output to said first and second power lines, by a part of inverse conversion of said AC/DC power conversion.

2. The electrically-powered vehicle according to claim 1, wherein in a case where said electrical heated catalyst device is operated when said power storage device is charged by said power supply, said charger controls electric power supplied to said electrical heated catalyst device by controlling said DC voltage between said first and second power lines, and controls the charging power of said power storage device by controlling DC power conversion between said first and second power lines and said power storage device.

3. The electrically-powered vehicle according to claim 1, wherein in a case where said electrical heated catalyst device is operated when the electric power is not supplied from said power supply, said charger converts the electric power from said power storage device into said DC voltage by said inverse conversion, and outputs said DC voltage to said first and second power lines.

4. An electrically-powered vehicle having mounted thereon an internal combustion engine and a motor for causing the vehicle to travel, the electrically-powered vehicle comprising:

an insulating mechanism having a primary side and a secondary side;

a power storage device for storing electric power supplied to said motor, the power storage device being electrically connected to the secondary side and electrically insulated from the primary side;

a power receiving unit for receiving the electric power supplied from a power supply external to the vehicle;

a charger for converting the electric power received by said power receiving unit into charging power of said power storage device when the electric power is supplied from said power supply, said charger including a first power converting unit for converting AC electric power received by said power receiving unit into DC electric power, and outputting the DC electric power to between first and second power lines, and a second power converting unit for performing bidirectional power conversion between said power storage device and said first and second power lines by a power conversion path passing through the insulating mechanism that is configured to transmit electric energy with the primary side electrically connected to said first and second power lines electrically insulated from the secondary side electrically connected to said power storage device; and an electrical heated catalyst device electrically connected to said first and second power lines so as to connect it to the primary side of said insulating mechanism and supply it with the DC voltage, the electrical heated catalyst being for electrically heating a catalyst that purifies exhaust gas from said internal combustion engine.

5. The electrically-powered vehicle according to claim 4, wherein in a case where said electrical heated catalyst device is operated when said power storage device is charged by said power supply, said charger controls the electric power supplied to said electrical heated catalyst device by controlling a DC voltage between said first and second power lines by said first power converting unit, and controls the charging power of said power storage device by said second power converting unit.

6. The electrically-powered vehicle according to claim 1, further comprising:

a first interrupting mechanism arranged between said first power line and said electrical heated catalyst device; and a second interrupting mechanism arranged between said second power line and said electrical heated catalyst device.

7. The electrically-powered vehicle according to claim 2, further comprising:

a first interrupting mechanism arranged between said first power line and said electrical heated catalyst device; and a second interrupting mechanism arranged between said second power line and said electrical heated catalyst device.

8. The electrically-powered vehicle according to claim 3, further comprising:

a first interrupting mechanism arranged between said first power line and said electrical heated catalyst device; and a second interrupting mechanism arranged between said second power line and said electrical heated catalyst device.

9. The electrically-powered vehicle according to claim 4, further comprising:

a first interrupting mechanism arranged between said first power line and said electrical heated catalyst device; and a second interrupting mechanism arranged between said second power line and said electrical heated catalyst device.

10. The electrically-powered vehicle according to claim 5, further comprising:

a first interrupting mechanism arranged between said first power line and said electrical heated catalyst device; and a second interrupting mechanism arranged between said second power line and said electrical heated catalyst device.

* * * * *